June 3, 1930. C. O. WELLMAN 1,762,004
INFINITELY VARIABLE SPEED RATIO POWER TRANSMITTING DEVICE
Filed March 17, 1923 5 Sheets-Sheet 3
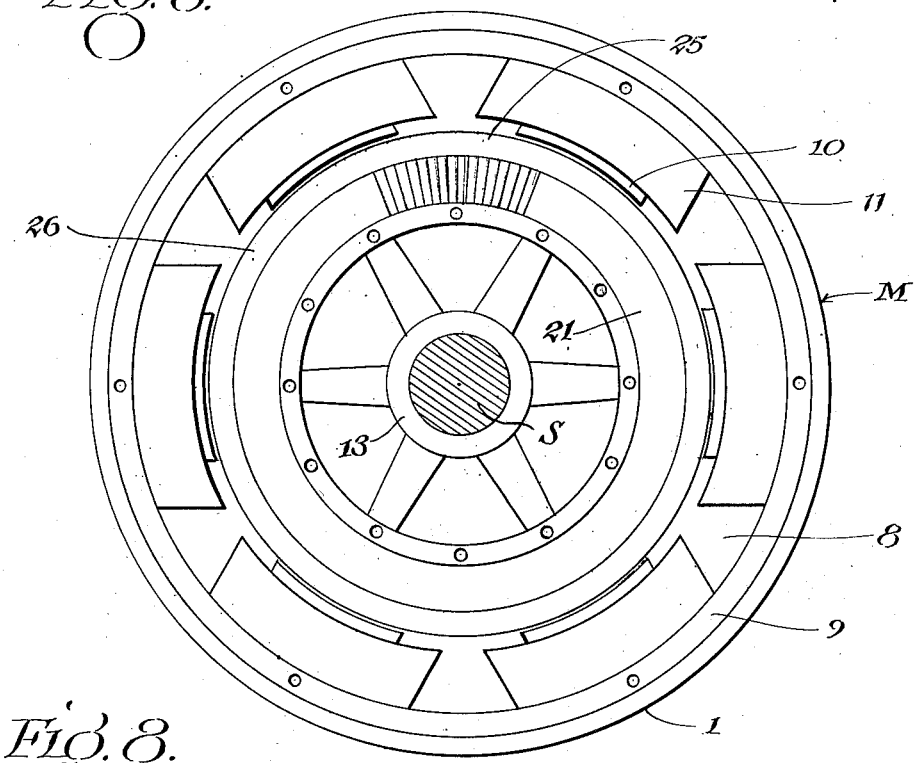
FIG. 3.
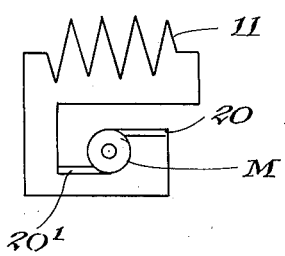
FIG. 8.
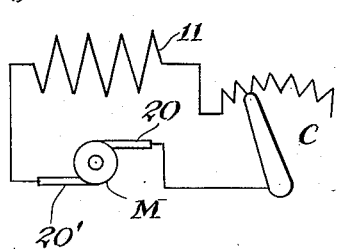
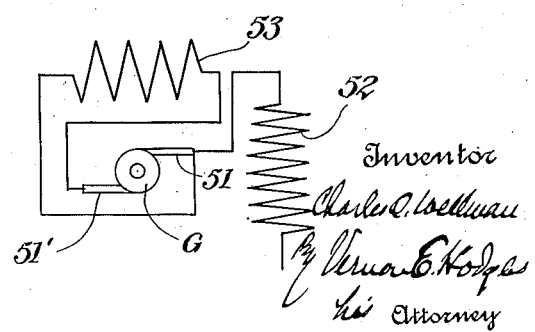
FIG. 9.

June 3, 1930.   C. O. WELLMAN   1,762,004
INFINITELY VARIABLE SPEED RATIO POWER TRANSMITTING DEVICE
Filed March 17, 1923   5 Sheets-Sheet 4

Inventor
Charles O. Wellman
By Delmont E. Hodge
his Attorney

June 3, 1930.  C. O. WELLMAN  1,762,004
INFINITELY VARIABLE SPEED RATIO POWER TRANSMITTING DEVICE
Filed March 17, 1923   5 Sheets-Sheet 5
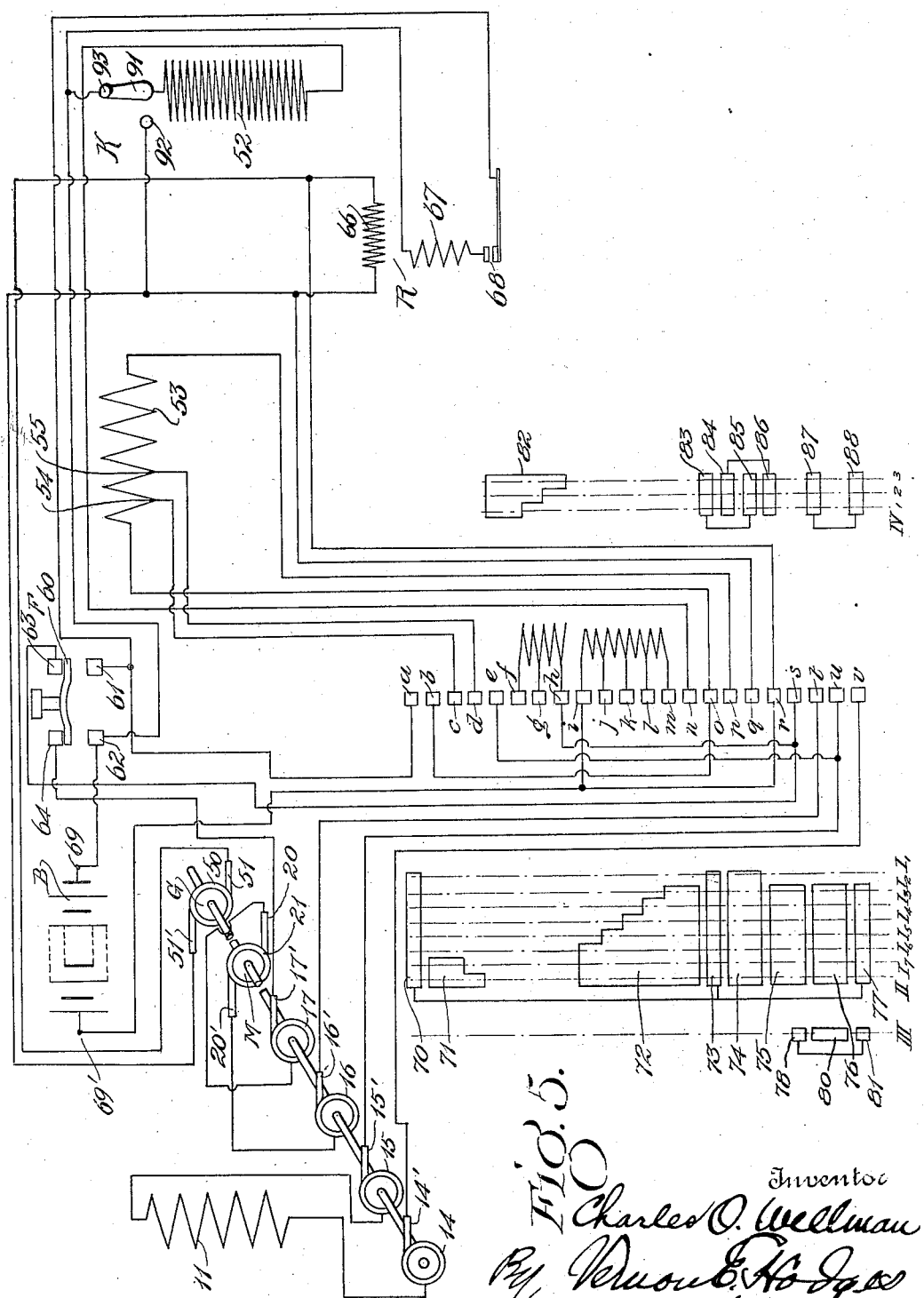

Patented June 3, 1930

1,762,004

UNITED STATES PATENT OFFICE

CHARLES O. WELLMAN, OF BINGHAMTON, NEW YORK

INFINITELY-VARIABLE SPEED-RATIO POWER-TRANSMITTING DEVICE

Application filed March 17, 1923. Serial No. 625,880.

This invention relates to power transmitting devices which permit variation in the ratio of speeds between the driving and the driven shafts, and a change in the torque exerted by the power plant upon the driven shaft, without necessitating individual gears for each ratio of speed.

The object is to provide an electrically operated and controlled mechanism of the type stated, which has no frictional contact between magnetized members, and in which magnetic fields having permissive relative movement, are caused to act as a short circuited series generator or are excited from a generator driven by the driving shaft, or a storage battery.

Another object is to provide a device of this type in which the application of a greater load upon the driven shaft will automatically change the speed ratio to take care of this greater load at a greater torque by using a lower gear ratio, while the power plant operates at approximately the same speed irrespective of changes in load.

Another object is to facilitate varying this speed ratio as thus automatically established, without loss of efficiency.

Another object is to enable the operator by means of a single foot pedal to have instantaneous control of either power or braking positions, and of the starting system; and also by means of this same pedal to be able to throw all of the battery energy into the generator.

Further objects are to provide means for electrically braking the speed of the driven shaft when necessary, for starting the main power plant, and for accomplishing such other purposes as may appear in the practical operation of the plant as a whole.

In the accompanying drawings, I have shown one embodiment of this mechanism, and the circuits involved therewith.

In the accompanying drawings:

Fig. 3 is a cross-section on line 3—3 of Fig. 2;

Fig. 5 shows the connections of the various parts of the system diagrammatically; and Figs. 6, 7, 8 and 9 show the connections of parts of the mechanism respectively during starting, normal running and charging, slow speed running, and braking.

Figure 1:
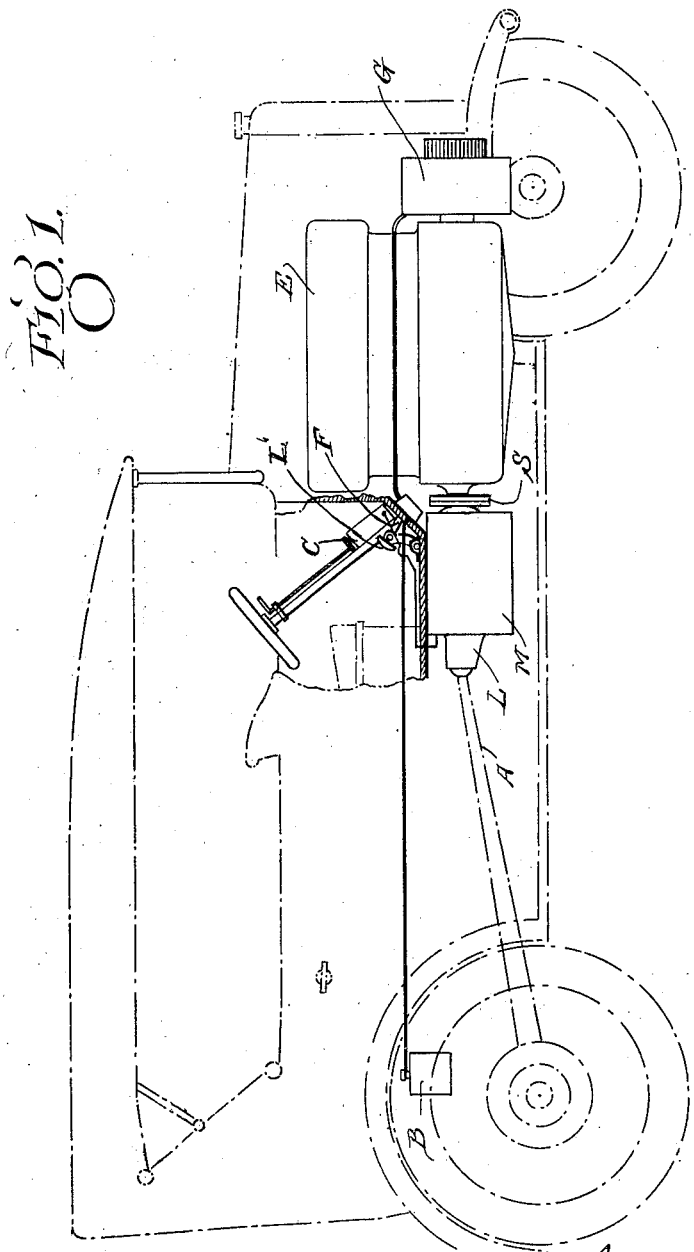
Fig. 1 is a side elevation of the assembly of the system, shown as applied in a self-propelled vehicle, the parts of the vehicle being conventionally represented.
Figure 2:
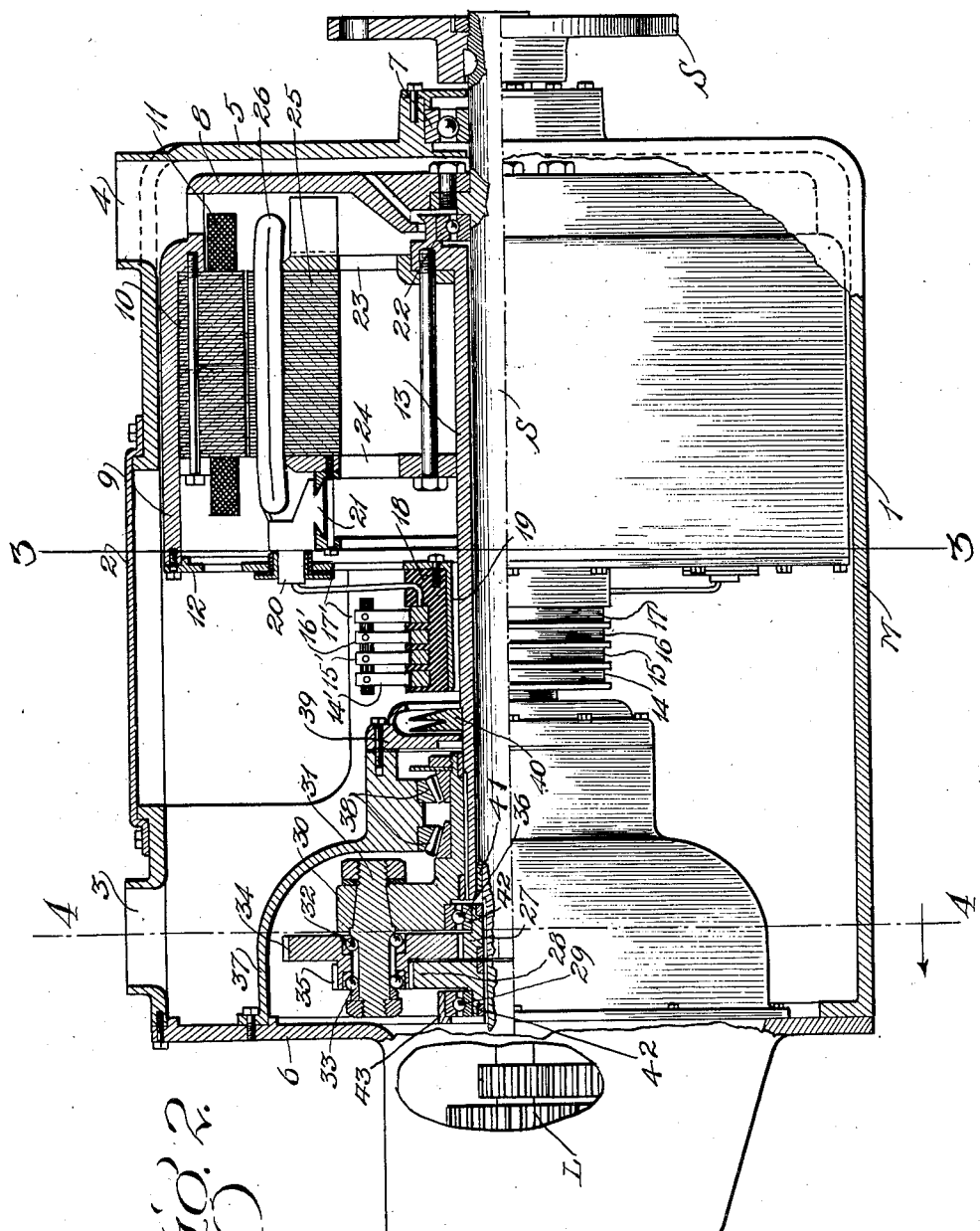
Fig. 2 is a longitudinal section through the transmission element.
Figure 4:
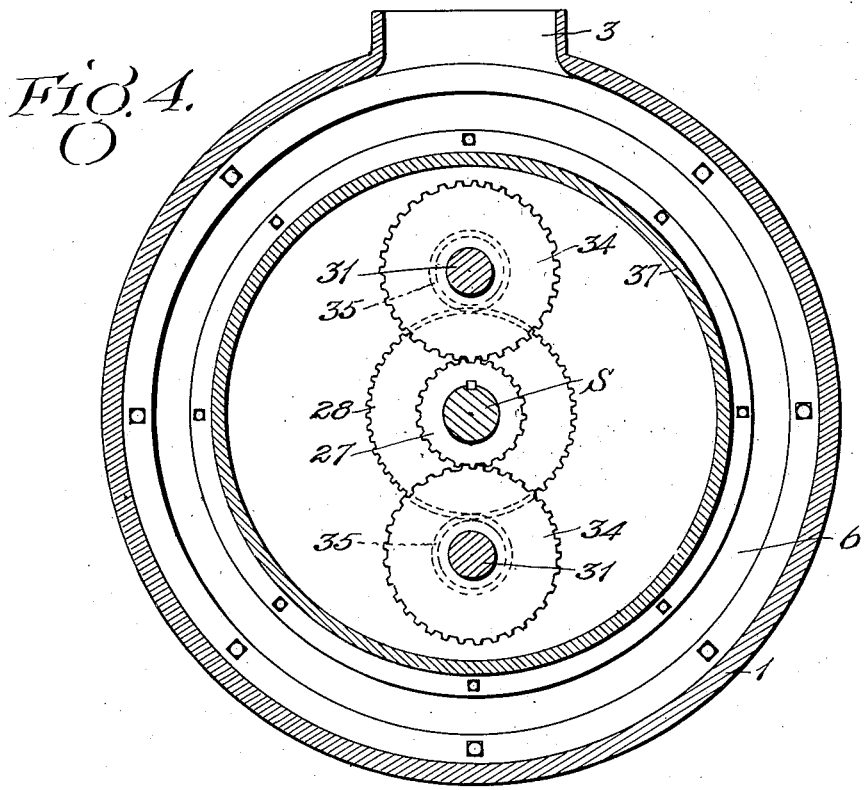
Fig. 4 is a cross-section on line 4—4 of Fig. 2.

In the embodiment of my invention shown in the drawings, E represents any suitable type of prime mover power plant, here represented as an internal combustion engine of the type ordinarily used in the propulsion of automative vehicles. This power plant E is used to drive directly a shaft S, without the intermediation of the clutch ordinarily employed in the propulsion system of such vehicles. Disposed at some point of this shaft, and keyed to turn with this shaft, is a differentially wound direct current generator G.

At another point of this shaft, preferably the rear end, is disposed a transmission element M. This transmission element plays a triple role. It is an electrical machine comprising two magnetizable members both rotatable with regard to the housing and with regard to each other; it may selectively operate as a series motor; receiving electrical energy from generator G, or as a short-circuited series generator receiving and transmitting power from the driving shaft S; or it may act as a short-circuited series generator receiving and transmitting power from shaft A through M to shaft S. With generator G short-circuited, shaft S can rotate but slowly, which in turn will greatly diminish the speed of shaft A. It furthermore comprises a gear train associated with the driven shaft A.

*Transmission element*

The transmission element M comprises a cylindrical casing 1 having an inspection cover 2 for ready access to the enclosed parts, air inlet 3 and air outlet 4 for ventilation, each of the latter being suitably protected by dust covers and screens; and the end walls 5 and 6 for the passage of the shafts.

The driving shaft S enters the housing through the end wall 5, and is supported therein by ball bearing 7. Securely keyed or otherwise fastened to this shaft S is a disc 8 which carries at its periphery an axially extended cylinder 9 forming a field frame to receive the laminæ 10 with coils 11 mounted thereon. At the opposite end of the frame 9 from disc 8 is a second disc 12 which extends inwardly towards the hollow armature shaft 13, and is rotatably adjustable in relation to the field frame to enable proper brush setting, and has a series of four collector rings 14, 15, 16, 17 mounted in an insulated cylinder 18 on a collar 19 which is made integral with this second disc 12.

Likewise mounted on this disc 12 are brushes 20 cooperating with a commutator 21 which rotates with the armature.

This armature comprises a hollow shaft 13 mounted with ball bearings 22 for easy rotation about the driving shaft S but independently of it. Two discs 23, 24 on this hollow shaft serve to support the armature laminæ 25 with armature coils 26 thereon. As stated above, the commutator turns with the armature and the coils 26 are suitably connected to this commutator. Mounted on the end of the armature opposite the commutator are blower vanes which circulate ventilating air through the commutator, armature and windings.

The field coils 11 and armature coils 26 are wound as in direct current technics generally to afford any desired number of poles. The number of brushes 20 correspond to this number of poles, here six. The positive and negative bus wires from these brushes, and from coils 11 are led to the collector rings 14, 15, 16, 17, from which connections are made by means of the corresponding brushes 14', 15', 16', 17' which are mounted in suitable manner and insulated from the main housing 1, but held rigidly stationary with it.

The shaft A enters the housing 1 through end wall 6, and is disposed coaxially with the driving shaft S, and abuts against the same. At these abutting ends, the driving shaft S is provided with a small spur or herringbone gear 27, and the driven shaft A with a larger gear 28. A ball bearing 29 is provided about the shaft A. The hollow armature shaft 13 extends rearwardly as far as the gear 27 and has an outwardly directed flange or spider 30 on its end. This spider 30 carries one or more stub shafts 31 extending out over the gears 27 and 28. Mounted with ball bearings 32, 33 for easy rotation on these stub shafts are double gears 34, 35 which form in conjunction with the gears 27 and 28, an epicyclic reducing train. Obviously the ratio of reduction depends on the ratio of the gears.

In order to properly support the shaft S at this end, a ball bearing 36 is interposed between it and the spider 30. A bushing 41, is pressed into this end of the armature shaft, and maintains proper alignment of shaft S and armature shaft 13, when the plate 6 together with dished plate 37 is withdrawn as a unit. Hardened and ground bushings 42 are pressed into the ends of 28, 27, 30 to insure true running of these parts, where they are mounted on splined shafts.

43 is a bracket supporting bearing 29.

A dished plate 37 is bolted to the end wall 6 and extends inward to form an oil chamber for the gears. Roller bearings 38 are provided for the support of spider 30 which in turn supports the armature shaft 13 and the shaft S.

Oil guard 39 is bolted onto the plate 37. Double oil disc 40 is pressed onto shaft 13 and throws what oil that may reach it, into guard 39, from which it drains back into the gear chamber.

Attached to the rear end wall 6 of the transmission element is a selective gear box L which serves to give a reverse and emergency low speed gear in conjunction with the mechanism above. It is actuated by means of the usual control handle or pedal represented at L'.

I may also provide means for mechanically controlling the action of the said gear train and locking the driving and driven shafts together so that in case of a break-down in the electrical system, the vehicle, or other service that the transmission may be used in connection with; may be driven, or operated without using the electrical part of the transmission, but at the sacrifice of the automatic speed regulation and the electric braking.

*Electrical elements*

The differential generator G has a commutator 50, brushes 51—51', a shunt field 52, and a series or differential field 53 with auxiliary sections 54 and 55 for regulation.

The foot switch F is a pedal having a circuit closing bar 60 which may close either of the circuits from contacts 61 to 62 or from contacts 63 to 64, or by being held in a central position, it serves to open both of these circuits for purposes to be more fully described hereafter.

The charging relay R is a reverse current relay and comprises a shunt coil 66 and a series coil 67, the former being actuated by the generator and the latter by the battery discharging through it. If a reverse current occurs in the series coil, the resultant magnetic effect counteracts the effect of the holding or shunt coil and the armature is released. In this way, if the generator be stopped, the battery cannot discharge through it.

*Controller*

The controller C is of the drum or any other suitable type, and may be provided with blowout coils to handle the currents employed. It comprises a drum and finger contactors. The drum has contact plates disposed thereon, as will be seen in Fig. 5; which are arranged in two sets, one for "running" and the other for "braking". The former comprises plates 70, 71, 72, 73, 74, 75, 76, 77, 78, 80, 81 and the latter plates 82, 83, 84, 85, 86, 87, 88. This drum is provided with the customary stops to prevent it from being turned past the last position in either direction. As indicated, the preferable arrangement is to have the "running" positions I, II, and III at one side of the zero position, and the "braking" or IV position on the other. Inasmuch as the specific construction is no part of my invention as outlined in this description, the parts are shown conventionally by a diagram.

Cooperating with these plates are a series of fingers contactors $a$ to $v$, inclusive, which are connected to the various electrical elements of the system. In this way the controller C serves to make or break the circuits in proper sequence.

As indicated in Fig. 5, I prefer to use a zero position near the middle of the drum, and positions I, II, III in one direction, and position IV in the other. Position I is the "starting" position, as in it, the battery is used to start the prime mover; or when coasting with the prime mover not rotating, the foot starting switch may be depressed in any of the normal running positions, to send current to generator G which, by acting as a motor, will impart initial rotation to the prime mover. Position II is the normal "running" position, and has several sub-positions or points, in which resistance or series field turns are successively cut out. Position III is the "low speed" position, with the transmission element motor short-circuited and acting as a series generator. Position IV is the "braking" position.

*Starting position*

Figure 6:
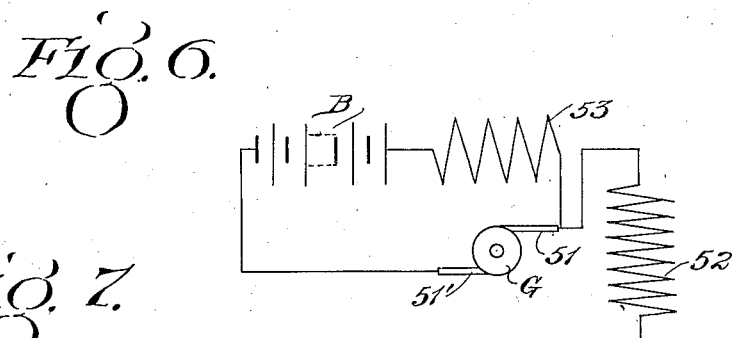
Figure 7:
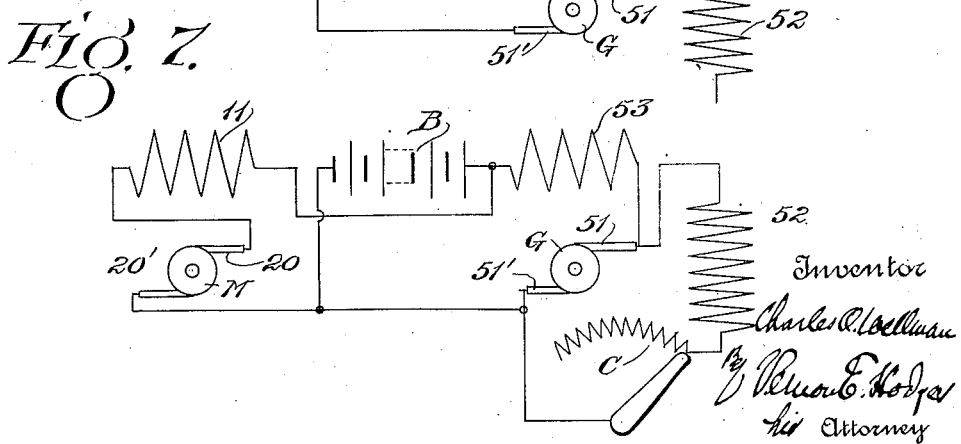

Assuming that the vehicle and engine are at a standstill, when the operator wishes to drive forward, he moves the controller C to position I, and pushes the foot pedal switch F until the bar 60 opens the circuit of element M and closes the circuit across 61—62. This connects the electrical elements as in Fig. 6. The battery B is now in series with the series field and armature of the generator G. The engine turns over under this impulse, and starts. As soon as the engine picks up, the foot switch is released; this opens the starting circuit and closes one branch of the circuit to the element M, and leaves the engine running. The circuit is:

69′—$r$—51—50—51′—$q$—74—$p$—53—55—54—$o$—73—70—$a$—61—60—62—69.

The switch K is provided to allow excitation of the generator shunt field by the battery current. This allows the generator to be rapidly brought to maximum output and allows a snappy get-away; or in case that the battery is not working or out of the car, the generator G may be self excited by moving the switch K to the other position.

*Charging position*

With the engine turning over, and the generator voltage of G having become high enough to close the relay, the current from the generator G flows through the relay coil 66 and closes relay R at 68. The generator then charges the battery. The drum contacts, it will be noted, are purposely made to run throughout in the II position for this purpose. It is apparent, therefore, that as long as the machine is running forward, in the normal running controller position, the battery is charging. The circuit is:

69′—$r$—51—50—51′—$q$—74—$p$—53—55—54—$o$—73—70—$a$—68—67—62—69.

*Low speed position*

This position permits the engine to drive the rear axle directly through the element M acting as a short circuited series generator without any frictional contact of the magnetic parts, and allows the use of a much smaller generator plant than would be required for direct driving on idling engine speeds. The field and armature of the motor element are short circuited, but permit a greater slip in event of a sudden application of a heavy load. This position is represented in Fig. 8. While driving in any of the forward running positions, closing the throttle permits coasting without changing controller position and the coasting car will not turn the engine. The circuit is:

M—21—20′—16—16′—$t$—80—$u$—15—15′—11 (series field of motor)—14—14′—$v$—81—78—$s$—63—60 (foot switch)—64—17′—17 back to M.

*Normal running*

Under normal conditions of starting and running, the generator is first operated and connected to the driving motor with a resistance in series with the shunt field. The driving motor is connected as a simple series machine; and the four collector rings permit transmission of current to its rotating armature and rotating field. As the vehicle speeds up, this resistance is cut out, step by step, until the generator runs simply as differentially wound. This may be regarded as an efficient position, as there is no loss in any rheostat grids. To increase the speed above this point, the series field of the generator is decreased by cutting out a certain number of turns; this decreases the differential action, and permits the shunt field to excite the field more highly.

While running in this position, the motor element may be overrunning, i. e. delivering energy to the transmission gearing. The speed therefore in this position may be greater than the speed of the engine as reduced by this gearing. By varying the speed of the motor, therefore, the speed of the driven shaft A is varied, independently of the speed of the engine, which remains fairly constant under uniform conditions of load.

When the switch is moved into the running position, the current generated by the rotation of the generator G causes a magnetic drag to be exerted between the armature 25 and the field 10 of the transmission element M. This magnetic drag causes the armature and spider to rotate more slowly in relation to the field and to bring the shaft A into rotation smoothly and without jerkiness. It tends in rotating to add its speed to that of the shaft S. The final driving speed will be the speed of the shaft S plus the added speed caused by the rotation of the armature in excess of the speed of the field, as modified by the gear train. As the speed of a series motor is very susceptible to changes of load and input voltage, the adjustment of the field excitation of generator G by means of the shunt field rheostat and differential field coil permits a great range of speeds to be obtained. And without changing the voltage, by adjustment of the generator field excitation, the speed of the motor in element M will vary greatly with changes of load by virtue of the series motor chracteristic. This speed change will be modified in shaft A on account of the gearing contained in the element M. In all cases, the actual speed will be determined, as before, by the load and the quantity of the current delivered to the speed ratio control motor as governed by the differential coils of the generator G and by means of the rheostat.

If, however, a heavier load is encountered, as a steep hill, the speed of the series motor in M will fall off rapidly and the speed of the driven shaft A will drop toward the speed of the engine or possibly far below it, as reduced by the transmission gearing, with a corresponding increase of torque.

This transmission therefore operates automatically to asume heavier loads, without manual attention. The weight is less than that of a purely electrical transmission, the efficiency is higher and the flexibility is greater than a purely mechanical drive; also the rear wheel torque is greater than the former and equal to the latter.

The normal running position has a number of points, which may be considered as typical, those at $I_1$ (all resistance in) $I_6$ (all resistance out), and $I_8$ (reduced series field). The corresponding circuits are:

Driving circuit: $I_1$ to $I_6$.

G—50—51'—q—74—p—53—55—54—o—73—77—v—14'—14—11—15—15'—u—76—t—16'—16—20'—M—21—20—17—17'—64—F—63—s—75—r— and back to generator.

Shunt circuit, $I_1$.

G—50—51'—92—91—52—n—72—m (resistance)—i—r— back to generator, or 69—62—93—91—52—n—72—m—(resistance)—i—69'.

Driving circuit, $I_8$.

G—50—51'—q—74—p—53—55—d—71—b—o—73—77—v—14'—14—11—15—15'—u—76—t—M—17 etc.

Shunt circuit $I_6$ to $I_8$.

G—50—51'—92—91—52—n—72—i—r—and back to generator or 69—62—93—91—52—n—72—i—69.

In any normal running position, the power may be immediately shut off, without disturbing the controller C, by relieving the foot switch F. This does not interfere with the charging of the battery B. The main object however of the double action foot switch is to prevent battery current from flowing into the motor circuit of M when it is desired to start the engine with the controller in any of the normal running positions, as when the car is coasting with the engine stopped.

Braking position

The braking position permits the operator to exert a pre-determined braking effect; and thus enables him to apply a carefully calculated power which may be as great as possible without slipping the wheels. This position, like the previous ones, may be interrupted immediately by operation of the foot switch F. In it, the generator and motor are both short-circuited and so connected as to form generators. These connections will also permit the engine to be started by the momentum of the moving car. The circuits are:

Motor: M—21—20'—16—t—87—88—v—14—11—15—e—82— (resistance) g—h—63—60—(F)—64—17 and back.

Generator: G—50—51'—q—85—83—c—53—p—84—86 and back.

The generator G is short-circuited to permit a heavy current to flow in its circuit and cause its R. P. M. to fall to between 50 and 90 R. P. M. The full power of the engine could not run it faster with this connection. In the braking position, the ignition may be cut off as no engine power is needed. The motor is connected through a resistance forming a closed circuit:—For the greatest braking effect the motor acts as a short circuited series generator with a maximum R. P. M. of about 90. The shaft A drives the armature, the armature drags the field, and the field rotation is opposed by the generator G. The whole scheme is based on power absorption, the momentum of the moving car supplying the power, the units M and G absorbing it. This brake will not entirely stop the car and can never lock the wheels, since the generator action ceases when the units G and M no longer rotate.

As the controller C is moved over the further points, the braking resistances g—h are cut out, and the amperage flowing in the motor circuit increases, to strengthen the braking effect. Although only three braking points are represented, it is apparent that with them as with the normal running points, as many as may be desired may be employed.

The device differs greatly from a mere magnetic clutch. In clutches, the field and armature are intended to lock together. In this device, they are primarily intended to govern or control the gear ratio between the driving and driven shafts. In normal operation, most of the torque will be transmitted directly through the magnetic attraction of the members of the speed ratio control motor. When the speed of the armature is the same as that of the field, the gears will be at rest in relation to each other; the field armature and gears revolving as a unit. As the load decreases, the action of the current will cause the armature to revolve faster than the field, and will add to the speed of shaft A as modified by the gear train which then again becomes active. This action permits a higher speed at shaft A than could be given by a magnetic clutch, since the motor adds to the speed of the shaft A as determined by the gear ratios.

If it be desired to accelerate or decelerate the rate of speed, the control box C is operated, or the speed may be controlled entirely by the engine throttle. If it be desired to stop, the box may be manipulated to throw a braking resistance into the motor circuit, this motor then acting as a generator and the generator G short circuited. In this position the motor M becomes a magnetic brake, and as such its effectiveness is determined by the amount of resistance in its discharge grids. If it be desired to coast up to a crossing, or downhill, the foot switch may be used to break the circuits, braking included, temporarily.

When the vehicle is at a standstill with its engine not running, the control switch C is normally in the neutral position. In this position, circuits may be established by means of the foot switch between the motor and batteries; or between the generator and batteries, the latter arrangement being shown in the diagram. either arrangement imparts initial rotation to the shaft S. The vehicle being at a standstill, a powerful torque may be exerted on the engine through the unit M or directly by unit G, the latter is true whether the vehicle is at rest or in motion. The generator G is now being driven by the prime mover. The controller is moved to the first speed position, in which position the generator shunt field receives exciting current from the battery or direct from its own brushes; the field commences to build up; and current flows from generator G to unit M causing shaft S to rotate. The controller is gradually moved over to the normal running position and the speed of the vehicle is controlled as in conventional automotive practice, by the spark and throttle.

I claim:

1. A speed and torque varying power transmission system including a prime-mover, a driving shaft connected therewith, a driven shaft, large and small sun-gears connected respectively with the driven and driving shafts, planet-gears connecting the sun-gears together, a planet carrier for the planet-gears, and an electric motor having the armature thereof connected with the planet carrier, and the field structure connected with the driving-shaft for producing an increase in torque.

2. A speed and torque varying power transmission system including a prime-mover, a driving shaft connected therewith, a driven shaft, large and small sun-gears connected respectively with the driven and driving shafts, planet gears connecting the sun gears together, a planet carrier for the planet gears, an electric motor having the armature thereof connected with the planet carrier, the field structure being connected with the driving shaft, and means connected with said motor for producing an increase in torque in the driven shaft.

3. A speed and torque varying power transmission system including a driving shaft, a driven shaft, sun gears connected respectively with said driving and driven shafts, planet gears connecting the sun gears together, and an electric motor having the armature connected with the planet gears, and having the field thereof connected with the driving shaft.

4. A speed and torque varying power transmission system including a driving shaft, a driven shaft, small and large sun gears connected respectively with the driving and driven shafts, planet gears connecting the sun gears together, a planet carrier for the planet gears, a sleeve fitted over the driving shaft and carrying the planet carrier, said sleeve being rotatably mounted relative to the driving shaft, and an electric motor having the armature thereof carried by said sleeve, and having the field carried by the driving shaft.

5. A speed and torque varying power transmission system including a prime-mover, a driving shaft connected therewith, a driven shaft, large and small sun gears connected respectively with the driven and driving shafts, planet gears connecting the sun gears together, a planet carrier for the planet gears, and an electric motor having a relatively movable armature and field, one of said members being connected with the driving shaft, and the other with the planet carrier.

6. A speed and torque varying power transmission system including a driving shaft, a driven shaft, an epicycle gear train connecting the driving and driven shafts together for producing an increase in torque and including sun and planet gears, a planet carrier for the planet gears, and an electric motor having a relatively movable armature and field, one of said members being connected with the driving shaft, and the other with the planet carrier.

7. A speed and torque varying power transmission system including a driving shaft, a driven shaft, sun gears connected respectively with said driving and driven shafts, planet gears connecting the sun gears together, a planet carrier for the planet gears and an electric motor having relatively movable field and armature, one of which is connected with the driving shaft, and the other with the planet carrier, for producing an increase in torque.

In testimony whereof I affix my signature.

CHARLES O. WELLMAN.